US009663008B2

(12) United States Patent
Akutsu et al.

(10) Patent No.: US 9,663,008 B2
(45) Date of Patent: May 30, 2017

(54) ATTACHMENT STRUCTURE FOR MEMBERS AND VEHICLE SEAT

(71) Applicant: TS TECH CO., LTD., Asaka-shi, Saitama (JP)

(72) Inventors: Takeshi Akutsu, Tochigi (JP); Hiroshi Izawa, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 1 day.

(21) Appl. No.: 14/418,365

(22) PCT Filed: Aug. 6, 2013

(86) PCT No.: PCT/JP2013/071205
§ 371 (c)(1),
(2) Date: Jan. 29, 2015

(87) PCT Pub. No.: WO2014/024859
PCT Pub. Date: Feb. 13, 2014

(65) Prior Publication Data
US 2015/0197174 A1    Jul. 16, 2015

(30) Foreign Application Priority Data

Aug. 7, 2012   (JP) .................................. 2012-175447
Aug. 7, 2012   (JP) .................................. 2012-175448

(51) Int. Cl.
*A47C 7/02*   (2006.01)
*B60N 2/68*   (2006.01)
(Continued)

(52) U.S. Cl.
CPC ........... *B60N 2/682* (2013.01); *B60N 2/5825* (2013.01); *B60N 2/6009* (2013.01); *B60N 2/64* (2013.01); *B60N 2/68* (2013.01); *B60N 2/7094* (2013.01)

(58) Field of Classification Search
CPC ........... B60N 2/682; B60N 2/64; B60N 2/686
(Continued)

(56) References Cited

U.S. PATENT DOCUMENTS 3,695,707 A  * 10/1972  Barecki .................... B60N 2/22
                                                                  297/452.2
5,389,177 A  *  2/1995  Shuert .................... B29C 51/12
                                                                  156/245
(Continued)

FOREIGN PATENT DOCUMENTS

CN    202360470 U    8/2012
JP    60-982          1/1985
(Continued)

OTHER PUBLICATIONS

Office Action issued in counterpart Japanese Patent Application No. 2012-175448 on May 24, 2016, and corresponding English translation.
(Continued)

*Primary Examiner* — Laurie K Cranmer
(74) *Attorney, Agent, or Firm* — Hamre, Schumann, Mueller & Larson, P.C.

(57) ABSTRACT

A first member (back board 50) is provided with: a first plate-like portion 81 protruding in a first direction from the first member; a second plate-like portion 82 protruding in the first direction from the first member and located opposite the first plate-like portion in a second direction that is orthogonal to the first direction; a first engagement portion 81*a* protruding from a distal end portion of the first plate-like portion 81 toward the second plate-like portion 82 at a position shifted to a first side in a third direction that is orthogonal to the first direction and the second direction; and a second engagement portion 82*a* protruding from a distal end portion of the second plate-like portion 82 toward the first plate-like portion 81 at a position shifted to a second
(Continued)

side that is opposite to the first side in the third direction, and the second member (main side frame 21) is provided with a first rod-like portion 91 configured to be disposed between the first plate-like portion 81 and the second plate-like portion 82 and to be engaged with the first engagement portion 81a and the second engagement portion 82a.

19 Claims, 11 Drawing Sheets

(51) Int. Cl.
 B60N 2/58 (2006.01)
 B60N 2/60 (2006.01)
 B60N 2/70 (2006.01)
 B60N 2/64 (2006.01)
(58) Field of Classification Search
 USPC .................. 297/452.18, 452.38, 452.59
 See application file for complete search history.

(56) References Cited

U.S. PATENT DOCUMENTS

| | | | | |
|---|---|---|---|---|
| 6,702,377 | B2 * | 3/2004 | Nakano | B60N 2/4808 297/216.12 |
| 7,401,852 | B2 * | 7/2008 | Humer | B60N 2/4228 297/216.1 |
| 7,461,436 | B2 * | 12/2008 | Asano | B60R 13/0206 24/297 |
| 8,474,917 | B2 * | 7/2013 | Line | B60N 2/5825 297/188.04 |
| 8,870,292 | B2 * | 10/2014 | Sakai | B60N 2/7017 297/452.14 |
| 2005/0248189 | A1 * | 11/2005 | Prasatek | B60N 2/68 297/188.04 |
| 2011/0121624 | A1 * | 5/2011 | Brncick | B60N 2/0232 297/284.2 |

FOREIGN PATENT DOCUMENTS

| | | |
|---|---|---|
| JP | 61-106441 | 7/1986 |
| JP | 5-76354 | 10/1993 |
| JP | 3090325 | 9/2002 |
| JP | 2003-189975 | 7/2003 |
| JP | 2004-298489 | 10/2004 |
| JP | 2005-73953 | 3/2005 |
| JP | 2006-218153 | 8/2006 |
| JP | 2008-194368 | 8/2008 |

OTHER PUBLICATIONS

Office Action issued in counterpart Chinese Patent Application No. 201380041481.4 on Apr. 20, 2016, and corresponding English translation.

* cited by examiner

FIG.3
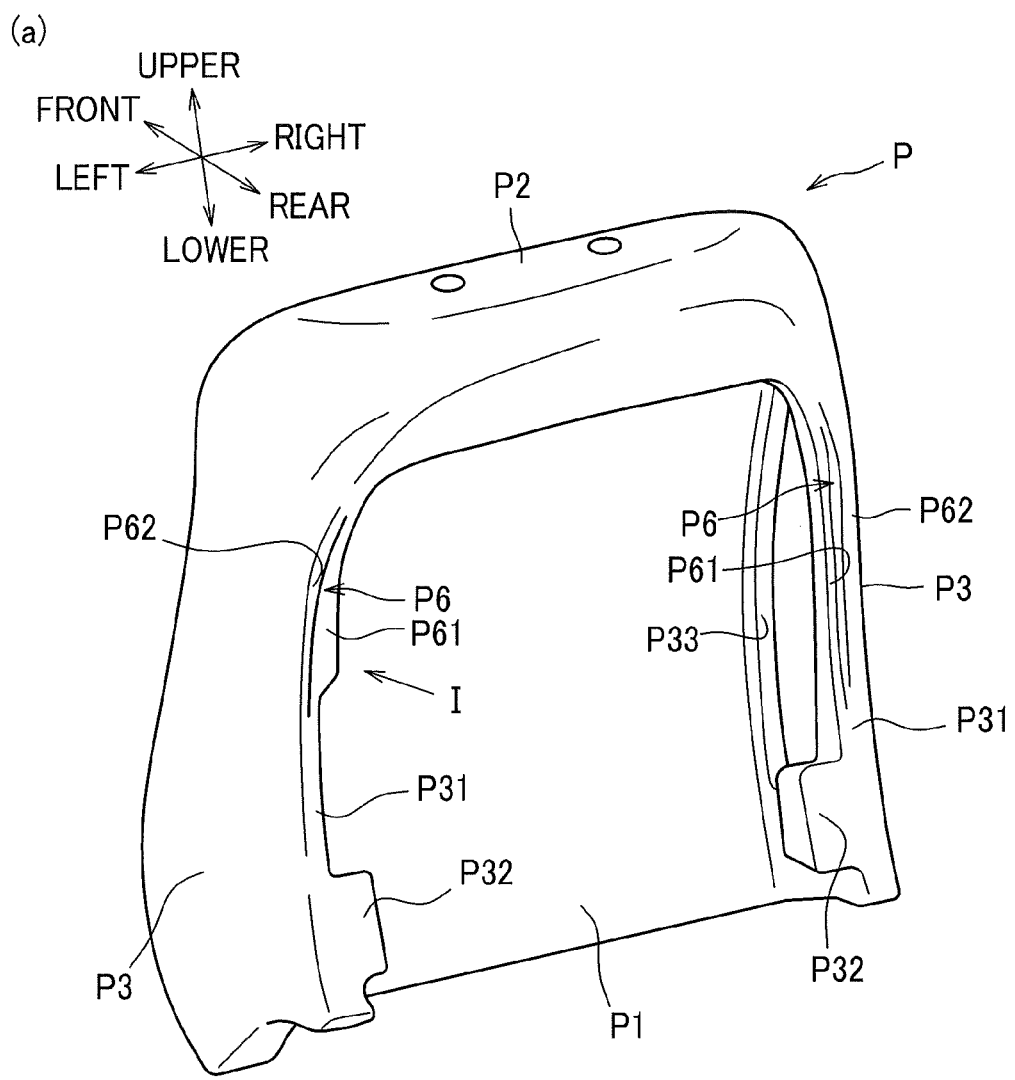
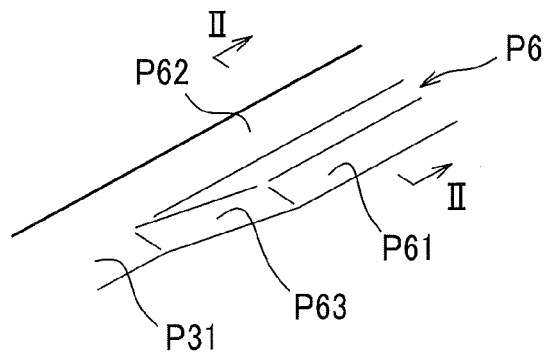
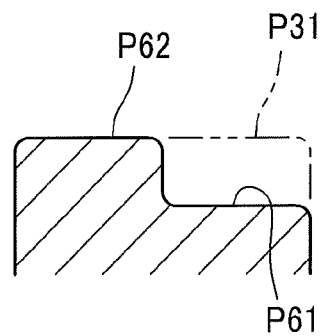

FIG.5
(a)
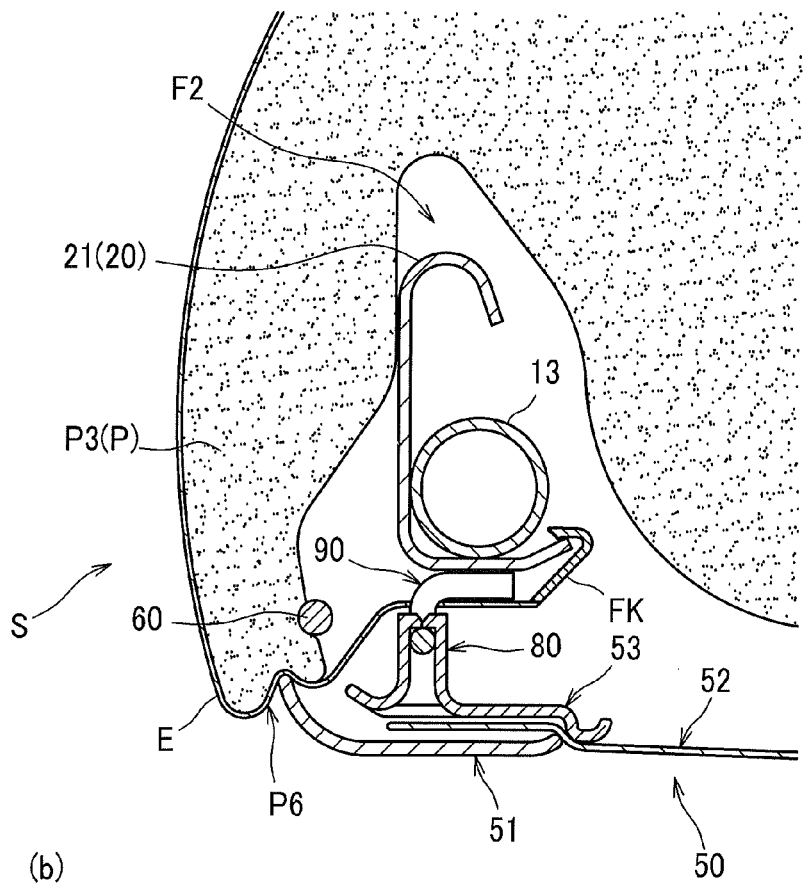
(b)
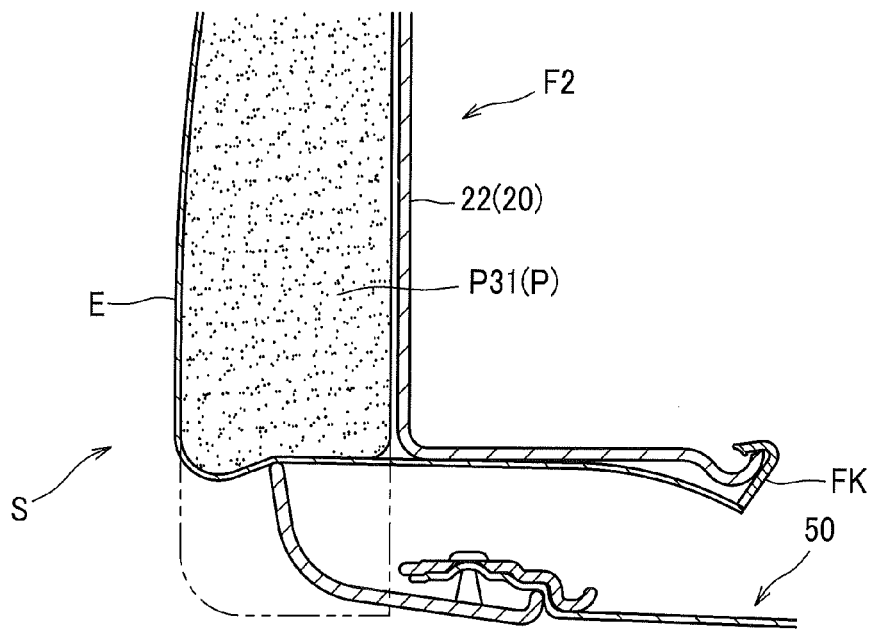

ATTACHMENT STRUCTURE FOR MEMBERS AND VEHICLE SEAT

TECHNICAL FIELD

The present invention relates to a member attachment structure for attaching a first member and a second member to each other. Further, the present invention relates to a vehicle seat comprising a seat back frame and a back board provided at a rear side of the seat back frame.

BACKGROUND ART

Conventionally, there is known a vehicle seat including a seat back frame, a cushion pad covered with a skin member and fixed to the seat back frame, and a back board fixed to the seat back frame.

For example, as a member attachment structure for attaching a back board to a wire member of a cushion pad from a rear side of the cushion pad, Patent Literature 1 discloses a structure in which the back board has plural pairs of hooks for sandwiching wire members in the upper-lower direction. More specifically, in this structure one of hooks in each pair includes a first pillar-shaped portion protruding frontward from the back board, and a first engagement portion protruding downward from the front end of the first pillar-shaped portion and having the same width as the first pillar-shaped portion.

The other one of hooks in each pair includes a second pillar-shaped portion protruding frontward from a position shifted in the right-left direction as well as in the upper-lower direction from that of the first pillar-shaped portion, and a second engagement portion protruding upward from the front end of the second pillar-shaped portion and having the same width as the second pillar-shaped portion.

Further, Patent Literature 2 discloses a vehicle seat with a back board, in which an upper portion of the back board includes hooks for temporarily attaching the back board to a seat back frame, and a lower portion of the back board includes screw holes for fixing the back board to the seat back frame.

CITATION LIST

Patent Literature

Patent Literature 1: Japanese Laid-open Patent Application, Publication No. 2003-189975

Patent Literature 2: Japanese Laid-open Utility Model Application, Publication No. H05-76354

SUMMARY OF THE INVENTION

In the attachment structure disclosed in Patent Literature 1, it is desired that a wire member and an engagement portion of a pair of hooks are more firmly engaged with each other.

In view of this, a first object of the present invention is to firmly engage the wire member (rod-like portion) and each engagement portion.

In order to achieve the first object, the present invention provides an attachment structure for members, by which a first member and a second member are attached to each other, wherein the first member is provided with: a first plate-like portion protruding in a first direction from the first member; a second plate-like portion protruding in the first direction from the first member and located opposite the first plate-like portion in a second direction that is orthogonal to the first direction; a first engagement portion protruding from a distal end portion of the first plate-like portion toward the second plate-like portion at a position shifted to a first side in a third direction that is orthogonal to the first direction and the second direction; and a second engagement portion protruding from a distal end portion of the second plate-like portion toward the first plate-like portion at a position shifted to a second side that is opposite to the first side in the third direction, and wherein the second member is provided with a first rod-like portion configured to be disposed between the first plate-like portion and the second plate-like portion and to be engaged with the first engagement portion and the second engagement portion.

With this configuration, since each plate-like portion has a width greater than that of the corresponding engagement portion, the rigidity of each plate-like portion can be enhanced; therefore, the first rod-like portion and the engagement portions can be more firmly engaged with each other.

In the above configuration, it is preferable that the second member is provided with a second rod-like portion extending in the first direction from the first rod-like portion, and that the first engagement portion has an outer surface located at an outer side in the third direction and the second engagement portion has an outer surface located at an outer side in the third direction, and the outer surface of one of the first and second engagement portions closer to the second rod-like portion is configured to slant so as to be positioned inward in the third direction as it goes inward in the second direction.

In a configuration in which a second rod-like portion extending in the first direction from the first rod-like portion is provided, there may be a concern that even when each engagement portion engaged with the first rod-like portion is pulled in the first direction or in the third direction in an attempt to disengage from the first rod-like portion, it is difficult to disengage the engagement portion from the first rod-like portion because of the enhanced rigidity of each plate-like portion. In contrast, according to our proposed configuration, since each of the engagement portions has an outer surface located at an outer side in the third direction and the outer surface of one of the engagement portions closer to the second rod-like portion is configured to slant so as to be positioned inward in the third direction as it goes inward in the second direction, the engagement portion can be easily removed from the second rod-like portion in the third direction.

In the above configuration, it is preferable that each of the first plate-like portion and the second plate-like portion is provided with a ridge portion.

It can be said that increased rigidity of the plate-like portions is preferable. In this regard, if each plate-like portion is provided with a ridge portion, the rigidity of each plate-like portion can be enhanced.

In the above configuration, it is preferable that the ridge portion is a rib, and that each of the first plate-like portion and the second plate-like portion has an outer surface that is located at an outer side in the second direction and connected to the first member by the rib.

In a configuration in which the above-described ridge portion is not connected to the first member, there may be a concern that the rigidity of each plate-like portion decreases. In contrast, according to our proposed configuration, since the ridge portion is a rib which connects the plate-like portion and the first member, the rigidity of each plate-like portion can be further enhanced.

In the above configuration, it is preferable that a wall protruding in the first direction from the first member is provided at one side of the rib opposite the plate-like portion, and that the rib and the wall are connected together.

For example, in a configuration in which one side of the above-described rib located opposite the plate-like portion is not connected to any wall, there may be a concern that the rigidity of the plate-like portion decreases. In contrast, according to our proposed configuration, since the one side of the rib located opposite the plate-like portion is connected to the wall, the rigidity of the plate-like portion can be further enhanced.

In the above configuration, it is preferable that the first member has a hole formed between the first plate-like portion and the second plate-like portion.

It is desired that the weight of the first member is reduced. In this regard, according to our proposed configuration, since a hole is formed in the first member between the first plate-like portion and the second plate-like portion, the weight of the first plate-like portion can be reduced.

If the above configuration further comprises a third member to which the first member is fixed at a plurality of fixing points, it is preferable that the first and second plate-like members are provided between two adjacent fixing points.

As described above, it can be said that increased rigidity of the plate-like portions is preferable. In this regard, according to our proposed configuration, since the first and second plate-like members are provided at a higher-rigidity region between two adjacent fixing points, the rigidity of each plate-like portion can be further enhanced.

In the above configuration, if the second member is a seat back frame for a vehicle seat, and the first member and the third member are members that constitute a back board provided at a rear side of the seat back frame, the first member and the third member having frame shapes and configured to sandwich a pocket member between them, it is preferable that at least one of the two fixing points is located in proximity to a thickened portion of the pocket member.

In a configuration in which the first member and the third member sandwiches the pocket member between them, there may be a concern that the pocket member and the third member are not flush with each other because the thickened portion of the pocket member is not tightly held depending on the arrangement of the fixing points at which the first member and the third member are fixed. In contrast, according to our proposed configuration, since at least one of the two fixing points that are adjacent to each other with the first plate-like portion and the second plate-like portion interposed therebetween is located in proximity to the thickened portion of the pocket member, the thickened portion of the pocket member can be tightly held at the fixing points; therefore, the pocket member and the third member can be substantially flush with each other.

In the above configuration, it is preferable that at least a part of the first and second plate-like portions is located on a protruding tab configured to protrude outward from an outer peripheral edge of the first member, and that the plurality of fixing points are arranged at positions inward of the protruding tab.

For example, in a configuration in which the first and second plate-like portions are located at positions closer to the inner perimeter of the frame-like first member, the distance between the lateral end portion of the back board and the plate-like portion becomes longer with the result that a large moment is applied to the plate-like portion when the right or the left end portion of the back board is tugged; this may possibly cause the back board to be easily disengaged from the seat back frame. In contrast, according to our proposed configuration, since the plate-like portion is located on the protruding tab configured to protrude outward from the outer peripheral edge of the first member, the distance between the lateral end portion of the back board and the plate-like portion lessens; therefore, the moment applied to the plate-like portion when the right or the left end portion of the back board is tugged can be decreased, so that the back board is less likely to come off the seat back frame.

Further, for example, in a configuration in which the outer perimeter of the first member extends to the outer edge of the protruding tab and the fixing points are arranged in the vicinity of this outer perimeter, there may be a concern that the first member is enlarged in size. In contrast, according to our proposed configuration, since the protruding tab is provided only at a position where the plate-like portion is located and the other outer perimeter is located inward of the protruding tab, the first member can be miniaturized.

In the meantime, the structure disclosed in Patent Literature 2 includes the hook portion and the screw hole which are spaced apart in the upper-lower direction, and this configuration is likely to be subject to manufacturing error. Accordingly, there may be a concern that when the hook portion is brought into engagement with the seat back frame, the screw hole does not match the fixing position of the seat back frame and a time-consuming operation is required for positioning the screw hole with respect to the fixing position.

In view of the above, a second object of the present invention is to provide a vehicle seat which can achieve an easy operation for positioning the screw hole (fixing portion) with respect to the fixing position of the seat back frame after the back board is temporarily fixed to the seat back frame.

In order to achieve the second object, the present invention provides a vehicle seat comprising: a seat back frame; and a back board provided at a rear side of the seat back frame, wherein the back board includes at least one fixing portions fixed to the seat back frame, and at least one temporary joint portions engageable with the seat back frame so as to be retained by the seat back frame, and wherein the fixing portion and the temporary joint portion are adjacent to each other.

With this configuration, since the temporary joint portion and the fixing portion are adjacent and less likely to be subject to manufacturing error, even if the fixing portion and the fixing position of the seat back frame are misaligned due to manufacturing error, the amount of misalignment is extremely small with the temporary joint portion engaged with the engagement position of the seat back frame. Therefore, the operation for positioning the fixing portion with respect to the fixing position can be eased.

In the above configuration, it is preferable that the fixing portion and the temporary joint portion are provided at a lower portion of the back board such that they are laterally adjacent to each other.

For example, in a configuration in which the fixing portion and the temporary joint portion are adjacently arranged one above another, it is necessary that the fixing position and the engagement portion of the seat back frame be arranged one above another, which leads to an increase in size of the seat back frame (part to which the fixing portion and the temporary joint portion are attached) in the upper-lower direction. In contrast, according to our proposed configuration, since the fixing portion and the temporary joint portion are laterally adjacent side by side, the dimension of the seat back frame in the upper-lower direction can be decreased and thus the miniaturization of the seat back frame can be achieved.

In the above configuration, it is preferable that the fixing portion and the temporary joint portion are provided in pair at right and left sides of a lower portion of the back board, and that the fixing portions are arranged laterally outward of the temporary joint portions.

For example, in a configuration in which the fixing portions are arranged laterally inward of the temporary joint portions, when the right or the left end portion of the back board is tugged, a large moment is applied to a corresponding fixing portion spaced apart from the end portion of the back board; this may possibly cause the fixing portion to be disengaged from the seat back frame. In contrast, according to our proposed configuration, since the fixing portions are arranged laterally outward of the temporary joint portions, the moment applied to the fixing portion when the right or the left end portion of the back board is tugged can be decreased, so that the attachment rigidity of the back board to the seat back frame can be enhanced.

In the above configuration, it is preferable that the seat back frame includes a hole with which a distal end of the temporary joint portion is engageable, and a first slanted surface provided under the hole and configured to guide the distal end of the temporary joint portion toward the hole from a lower side to an upper side.

For example, in a configuration in which the seat back frame includes a hole with which the distal end of the temporary joint portion is engageable but does not include a first slanted surface for guiding the distal end of the temporary joint portion toward the hole from the lower side to the upper side, there may be a difficulty in matching the distal end of the temporary joint portion in the upper-lower direction to the hole. In contrast, according to our proposed configuration, since the first slanted surface is provided under the hole, the attachment work of the back board can be eased because the distal end of the temporary joint portion can be guided in the upper-lower direction toward the hole.

In the above configuration, it is preferable that a pair of second slanted surfaces configured to guide the distal end of the temporary joint portion in a laterally inward direction are provided at right and left sides of the first slanted surface.

For example, in a configuration in which second slanted surfaces for guiding the distal end of the temporary joint portion in the laterally inward direction are not provided at right and left sides of the first slanted surface, there may be a difficulty in matching the distal end of the temporary joint portion in the right-left direction to the hole. In contrast, according to our proposed configuration, since the second slanted surfaces are provided at the right and left sides of the first slanted surface, the attachment work of the back board can be eased because the temporary joint portion can be positioned in the right-left direction.

In the above configuration, it is preferable that the first slanted surface and the second slanted surface are integrally formed as a recess portion, and that the distal end of the temporary joint portion is engageable with an upper edge portion of the recess portion, which forms a lower edge of the hole.

For example, if the first slanted surface is formed by lancing of a sheet metal (cutting and raising a sheet metal) and the second slanted surface is made from a material that is different from the one from which the first slanted surface is made, there may be a concern that the temporary attachment of the back board is not performed successfully when the distal end of the temporary joint portion is brought into engagement with the upper edge portion of the first slanted surface because the rigidity of the plate-like portion which constitutes the first slanted surface is low. In contrast, according to our proposed configuration, since the first slanted surface and the second slanted surface are integrally formed as a recess portion, the temporary attachment of the back board can be performed successfully because the distal end of the temporary joint portion is engaged with a recess portion having a higher rigidity due to its recessed shape.

In the above configuration, it is preferable that the distal end of the temporary joint portion has a lateral width smaller than that of the hole.

With this configuration, the operation for attaching the distal end of the temporary joint portion to the hole can be eased.

In the above configuration, if the seat back frame includes a wire for supporting an occupant, it is preferable that as viewed from a rear side, the hole is formed in a position not overlapping the wire.

For example, in a configuration in which the hole is formed in a position overlapping the wire as viewed from the rear side, there may be a concern that the distal end of the temporary joint portion interferes with the wire when the distal end of the temporary joint portion is brought into engagement with the hole. In contrast, according to our proposed configuration, since the hole is formed in a position not overlapping the wire as viewed from the rear side, it is possible to prevent the distal end of the temporary joint portion from interfering with the wire.

In the above configuration, it is preferable that the temporary joint portion includes a base portion protruding frontward from the back board, and an engagement portion protruding frontward from the base portion and configured to be engageable with the seat back frame, and that the base portion is shaped like a bottomed tube which opens in a direction away from the fixing portion.

For example, in a configuration in which the base portion is solid, the weight of the back board may possibly be increased. In contrast, according to our proposed configuration, since the base portion is shaped like a bottomed tube, the weight of the back board can be reduced.

Further, in a configuration in which the bottomed tubular base opens in a direction toward the fixing portion, the rigidity of the fixing portion may possibly decrease. In contrast, according to our proposed configuration, since the opening of the base is directed in a direction away from the fixing portion, the rigidity of the fixing portion can be enhanced because the wall corresponding to the bottom of the bottomed tubular base is located adjacent to the fixing portion.

Other features and advantages of the present invention will be apparent from the following description taken in conjunction with the accompanying drawings.

BRIEF DESCRIPTION OF DRAWINGS

FIG. 3 includes a perspective view (a) of a seat back pad as viewed from the rear side, a partial view (b) of the seat back pad as viewed from the direction indicated by arrow I, and a sectional view (c) taken along the line II-II of FIG. 3(b).

FIG. 5 are sectional views of a rear left-side portion of a seat back, in which (a) is a sectional view taken in the vicinity of a stepped portion of the seat back pad, and (b) is a sectional view taken in the vicinity of a side portion constituent portion.

DESCRIPTION OF EMBODIMENTS

One embodiment of the present invention will be described in detail with reference to the accompanying drawings where necessary. In the following description, the entire structure of a car seat (vehicle seat) will be briefly described first, and then characterizing features of the present invention will be described in detail.

Figure 1:
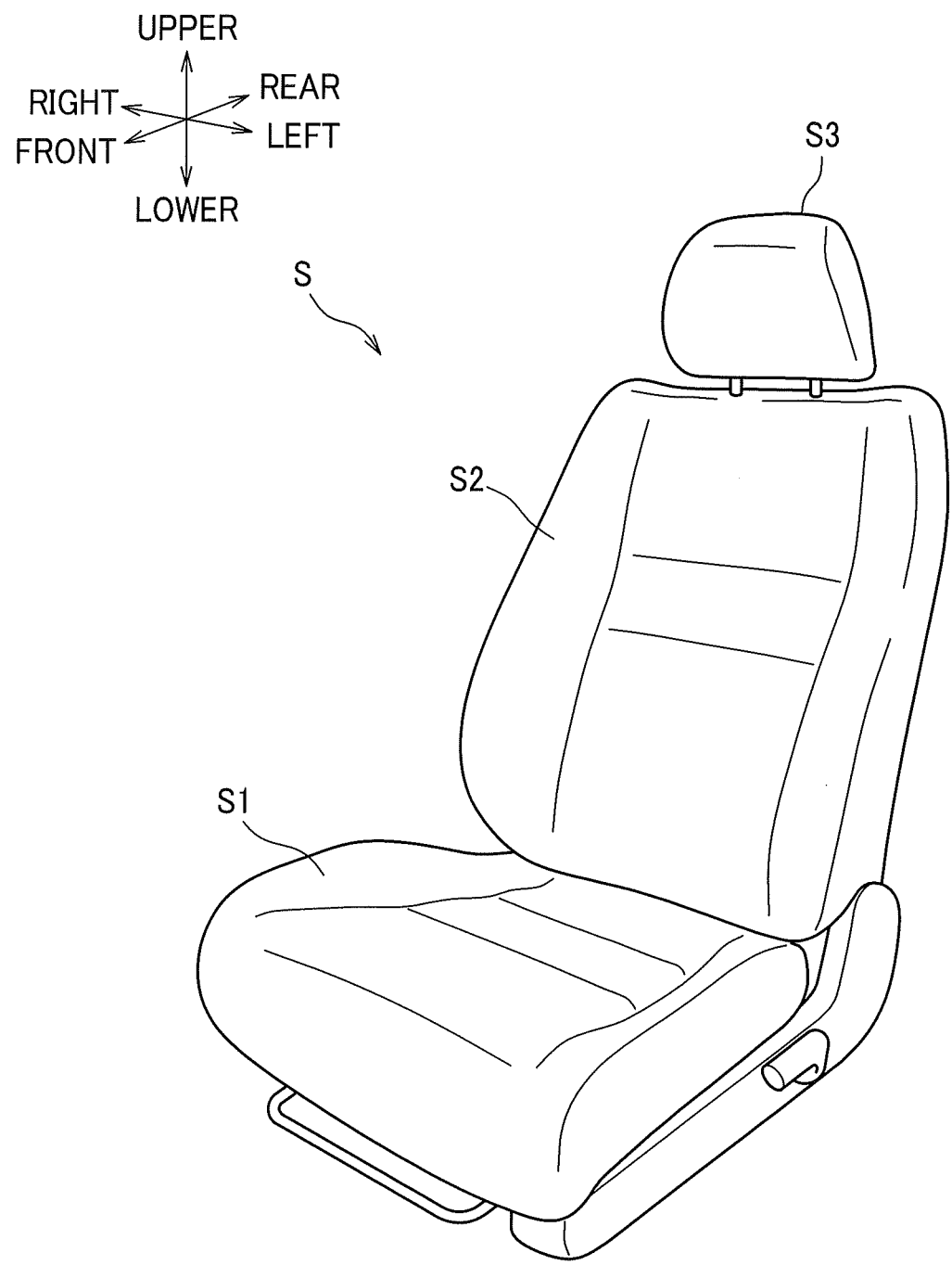
FIG. 1 is a perspective view of a car seat as a vehicle seat according to one embodiment.

As seen in FIG. 1, the car seat S is a seat for use as a driver's seat of a car, and mainly includes a seat cushion S1, a seat back S2, and a headrest S3.

Figure 2:
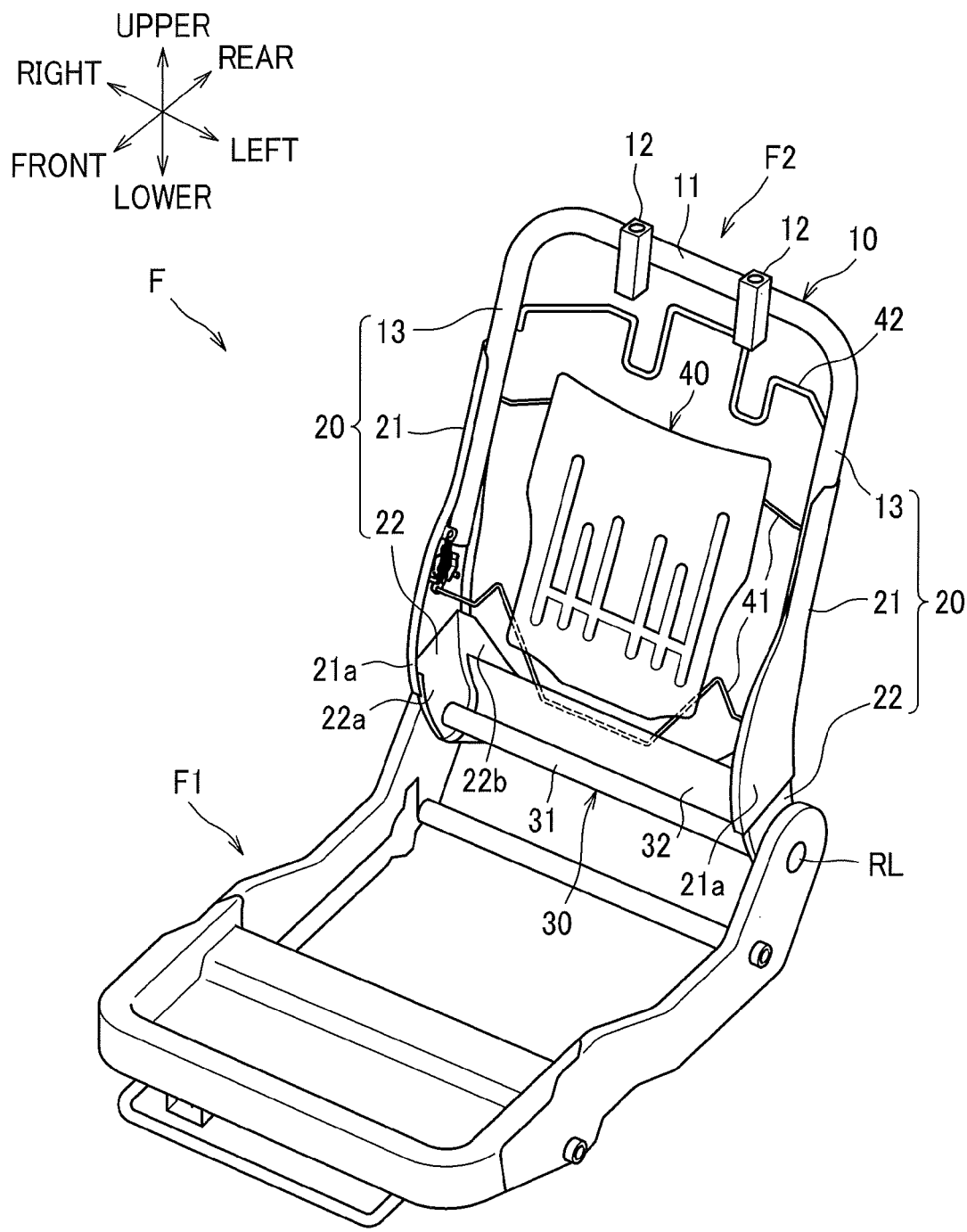
FIG. 2 is a perspective view of a seat frame embedded in the car seat.

A seat frame F as shown in FIG. 2 is embedded in the seat cushion S1 and the seat back S2. The seat frame F mainly includes a seat cushion frame F1 constituting a frame of the seat cushion S1, and a seat back frame F2 constituting a frame of the seat back S2. The seat cushion S1 is configured such that the seat cushion frame F1 is covered with a seat cushion pad made of a cushion material such as urethane foam, and a skin member made of synthetic leather or fabric. The seat back S2 is configured such that the seat back frame F2 is covered with a seat back pad P (see FIG. 3) made of a cushion material, and a skin member E (see FIG. 5) made of synthetic leather or fabric.

The seat back frame F2 has a lower portion which is rotatably connected to a rear portion of the seat cushion frame F1 via a reclining mechanism RL. Accordingly, the seat back S2 is tiltable in the front-rear directions relative to the seat cushion S1.

In this description, the front/back (frontward/rearward), right/left (lateral), and upper/lower directions are designated as from the view point of an occupant seated on the car seat S of which the seat back S2 is not tilted down by the reclining mechanism RL.

The seat back frame F2 mainly consists of an upper frame 10, right and left side frames 20, and a lower frame 30; the upper frame 10, the right and left side frames 20, and the lower frame 30 are joined together, for example, by welding to thereby form a frame-like configuration. A pressure-receiving member 40 configured to receive a load from the occupant and wires 41 are arranged inside the frame-like seat back frame F2.

The upper frame 10 is formed by bending a pipe material into a substantially U-shape configuration and includes a lateral pipe portion 11 extending in the right-left direction, and a pair of right and left support brackets 12 for attachment of the headrest S3 are fixed by welding to the front side of the lateral pipe portion 11. Right and left vertical pipe portions 13 of the upper frame 10 extend in the upper-lower direction; right and left main side frames 21 are joined to lower portions of the vertical pipe portions 13 and made into integral parts to thereby form right and left side frames 20.

It is to be noted that a rigid wire 42 with which an upper portion of a back board 50 to be described later (see FIG. 4) is engaged is provided at upper portions of the right and left vertical pipe portions 13; the rigid wire 42 is bent at proper positions and extends in the right-left directions.

Each side frame 20 includes the right or left vertical pipe portion 13 as described above, the right or left main side frame 21, and a lower side frame 22.

Each of the right and left main side frames 21 constitutes a middle portion of the side frame 20, and is made by press working sheet metal to have a substantially U-shaped cross section; the right and left main side frames 21 are arranged laterally opposite to each other. The main side frame 21 is connected to the vertical pipe portion 13 with its upper portion holding the vertical pipe portion 13, and the lower portion of the main side frame 21 protrudes frontward farther than the upper portion of the main side frame 21 to form a bulging portion 21a.

Each of the right and left lower side frames 22 constitutes a lower portion of the side frame 20, and is made by press working sheet metal to have a substantially U-shaped cross section; the right and left lower side frames 22 are arranged laterally opposite to each other. The lower side frame 22 is connected to the lower portion of the main side frame 21 by welding with its upper portion being held by the lower portion of the main side frame 21.

To be more specific, the lower side frame 22 has a width in the front-rear direction which is the same as that of the lower portion of the main side frame 21. In other words, the lower side frame 22 has a width in the front-rear direction which is wider than that of the narrower upper portion of the main side frame 21.

The lower frame 30 includes a connecting pipe 31 configured to connect right and left lower side frames 22, and a connecting beam 32. To be more specific, the connecting pipe 31 connects side walls 22a each corresponding to a bottom portion of the lower side frame 22 having a substantially U-shaped cross section, and the connecting beam 32 connects flange portions 22b each extending laterally inward from the rear end and the lower end of the side wall 22a of the lower side frame 22.

As seen in FIG. 3(a), the seat back pad P is a member for supporting the back of the occupant; the seat back pad P is put over the above-described seat back frame F2 from the front side and thereby supported by the seat back frame F2. To be more specific, the seat back pad P includes a front wall portion P1 for supporting the back of the occupant, an upper wall portion P2 configured to protrude rearward from the upper end portion of the front wall portion P1, and right and left side wall portions P3 configured to protrude rearward from the right and left end portions of the front wall portion P1.

A stepped portion P6, a side portion constituent portion P31, and a protruding portion P32 are provided at the rear portion of each of the side wall portions P3. The stepped portion P6 is provided at an upper side of the rear portion of each of the right and left side wall portions P3; as seen in FIGS. 3(b) and 3(c), inner portions P61 that are located laterally inward are lower in height than outer portions P62 that are located laterally outward. It is to be noted that the inner portions P61 are provided at regions corresponding to where the rod-like members 60 to be described later (see FIG. 6) are provided.

Figure 4:
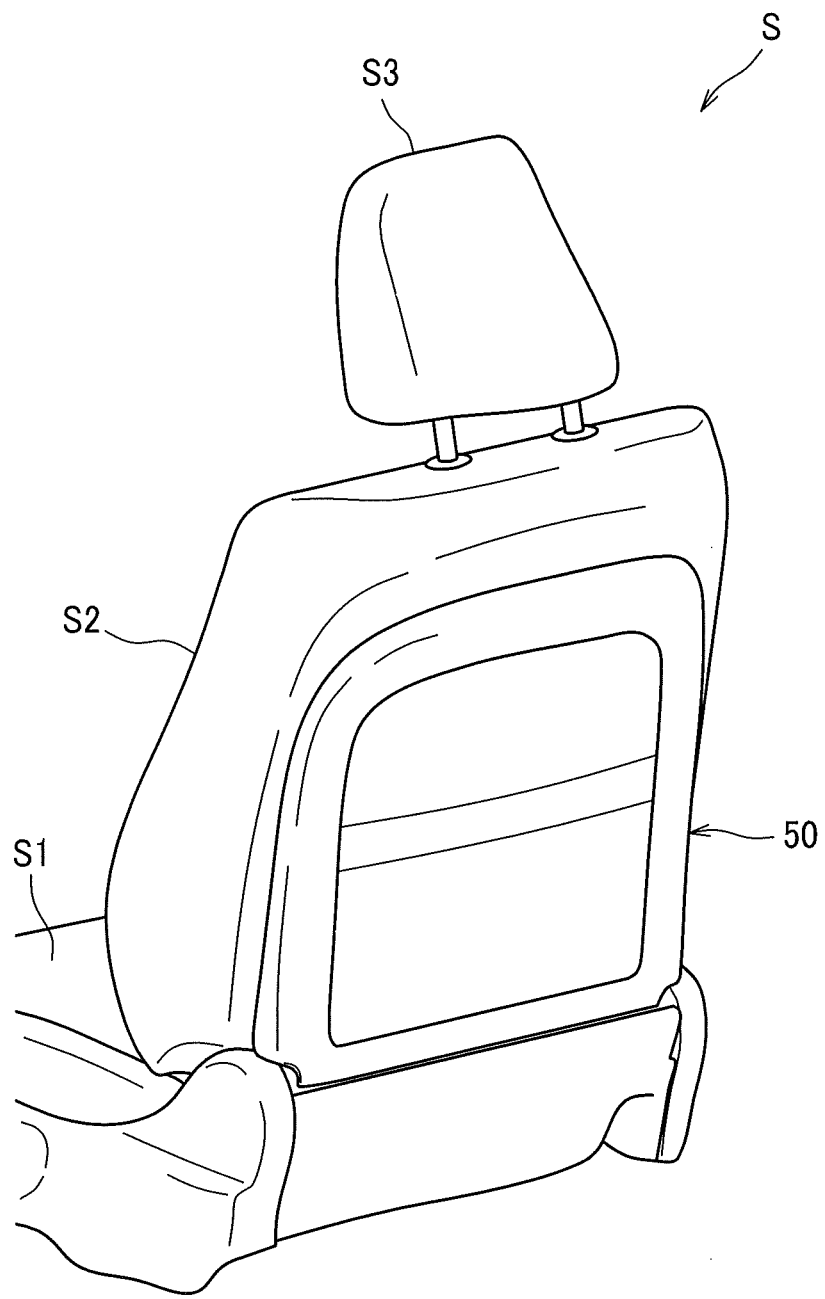
FIG. 4 is a perspective view of the car seat as viewed from the rear side.

As seen in FIG. 4, these stepped portions P6 are shaped to match the contour of the upper portions of the both right and left end edges of the back board 50 that is arranged at the rear side of the seat back frame F2. To be more specific, the stepped portions P6 of the seat back pad P have shapes to match the upper portions of the both right and left end edges of the back board 50 with the skin member E being sandwiched between the stepped portions P6 and the back board 50.

Accordingly, as seen in FIG. 5(a), the rear surface of the seat back pad P (more specifically, the skin member E) and the rear surface of the back board 50 are substantially flush with each other to improve the external appearance thereof, for example, as compared to the configuration in which the stepped portions P6 are not provided.

Returning to FIG. 3(a), the side portion constituent portions P31 are configured to be compressed to a larger extent than the other portions by the skin member E and the back board 50 which are examples of a compressing member to be described later; the side portion constituent portions P31 are arranged underneath the stepped portions P6. As seen in FIGS. 3(b) and 3(c), each of the side portion constituent portions P31 is shaped to be higher than the inner portion P61 of the stepped portion P6, and the rear surface of the inner portion P61 and the rear surface of the side portion constituent portion P31 are connected by a gently sloped surface P63.

Accordingly, it is possible to prevent a gap from being formed around the boundary between the inner portion P61 and the side portion constituent portion P31 when the lower portion of the back board 50 is pressed forward to compress the side portion constituent portions P31; therefore, a force can be applied substantially evenly to the side portion constituent portions P31 to excellently compress the side portion constituent portions P31.

As seen in FIG. 3(a), the protruding portions P32 are arranged underneath the side portion constituent portions P31 and formed to inwardly protrude from the side wall portions P3. Further, a through-opening P33 is formed to penetrate through the right side wall portion P3 in the right-left direction.

As seen in FIGS. 5(a) and 5(b), the outer side of the seat back pad P configured as describe above is covered with the skin member E. The skin member E wraps around the seat back pad P from the front side thereof and goes around to the rear side thereof, and is fixed to the seat back frame F2 using hooks FK provided at the end portions of the skin member E.

As shown by the phantom line of FIG. 5(b), since the side portion constituent portions P31 are configured to protrude rearward relative to the side frames 20 to a larger extent than the other portions, the side portion constituent portions P31 are largely compressed by the skin member E upon attachment of the skin member E. Therefore, since the side portion constituent portions P31 are compressed and hardened by the skin member E, it is possible to prevent wobble of the seat back pad P in the right-left direction.

Further, in this embodiment, when the back board 50 is attached to the seat back frame F2 from the rear side thereof after attachment of the skin member E, the side portion constituent portions P31 are further compressed by the right and left end portions of the back board 50. Since the side portion constituent portions P31 are compressed by both the skin member E and the back board 50, the amount of compression of the side portion constituent portions P31 can be increased to further harden the side portion constituent portions P31.

It is preferable that the side portion constituent portions P31 are compressed by the skin member E and the back board 50 to an amount not less than 40 mm. Since the side portion constituent portions P31 are compressed to an amount not less than 40 mm, it is ensured that the side portion constituent portions P31 are hardened, to thereby excellently prevent wobble of the seat back pad P.

As described above, since the side portion constituent portions P31 are compressed first by the skin member E and then by the back board 50, the amount of compression of the side portion constituent portions P31 at the time of attachment of the back board 50 can be reduced, so that the attachment work of the back board 50 can be eased.

Further, the side portion constituent portions P31 are supported from laterally inner sides thereof by the lower side frames 22 which are wider than the upper portions of the main side frames 21. Therefore, since the side portion constituent portions P31 can be stably supported by the widened lower side frames 22, it is possible to further prevent wobble of the seat back pad P.

The back board 50 is arranged such that a gap is formed between each of the right and left end portions of the back board 50 and the side frame 20. Further, the side portion constituent portions P31 are arranged such that the gap formed between each of the right and left end portions of the back board 50 and the side frame 20 is filled therewith.

Therefore, insertion of a material into the gap can be prevented because the side portion constituent portions P31 which are compressed and hardened fill these gaps; therefore, it is possible to prevent the back board 50 from coming off due to the object being inserted into the gaps formed between the right and left end portions of the back board 50 and the side frames 20.

Figure 6:
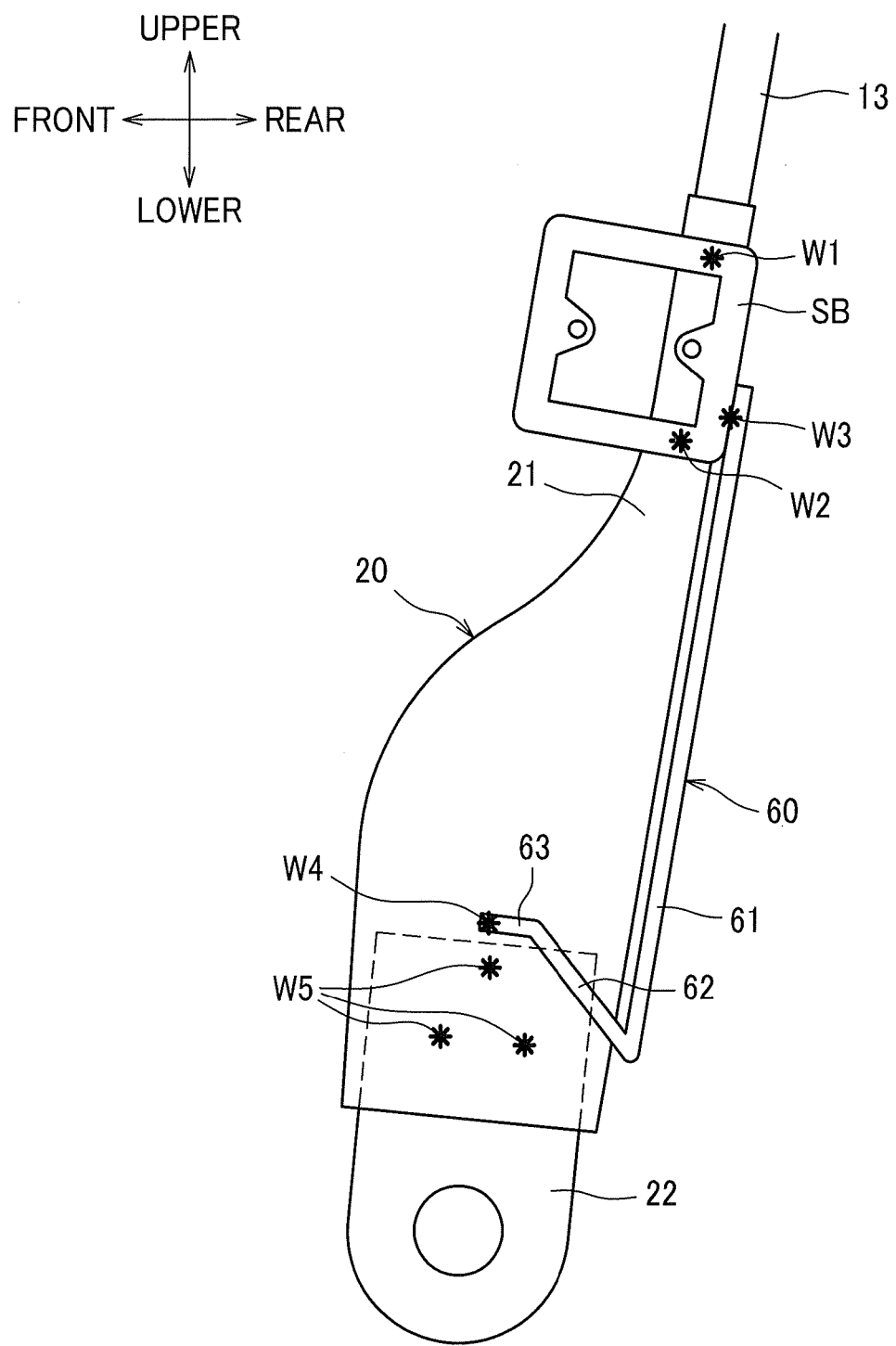
FIG. 6 is a side view showing a rod-like member.

Especially, in this embodiment, the side portion constituent portions P31 are arranged at lower parts of the spaces (gaps) formed between the right and left end portions of the back board 50 and the side frames 20, and as seen in FIGS. 5(a) and 6, at the upper parts of the spaces (gaps) higher than the side portion constituent portions P31 are provided the rod-like members 60 for supporting the seat back pad P from inner sides thereof. Therefore, the side portion constituent portions P31 that are to be compressed largely are arranged only in part of the gaps; this makes it possible to reduce the reaction force from the side portion constituent portions P31 at the time of attachment of the skin member E and the back board 50, so that the attachment work of the back board 50 can be eased.

More specifically, each rod-like member 60 includes a main body portion 61 elongated along the side frame 20, a first extension portion 62 extending in an obliquely frontward and upward direction from the lower end portion of the main body portion 61, and a second extension portion 63 extending in a substantially frontward direction from the front end of the first extension portion 62. Further, the upper end portion of the main body portion 61 is joined by welding to a switch bracket SB that is joined to the upper end portion of the main side frame 21 by welding.

To be more specific, the switch bracket SB is welded to the upper end portion of the main side frame 21 at two (upper and lower) welds W1, W2, and the upper end portion of the main body portion 61 is welded to the switch bracket SB at a weld W3 that is located between the two welds W1, W2. This configuration can enhance the mounting rigidity of the switch bracket SB. The switch bracket SB is a bracket for use in mounting a reclining switch and a sliding switch of the car seat S.

The end portion of the second extension portion 63 is joined to the lower part of the main side frame 21 by welding. To be more specific, the weld W4 (fixing position) for fixing the second extension portion 63 is located above three welds W5 (fixing positions) in which the main side frame 21 is fixed to the lower side frame 22.

With this configuration, it is possible to prevent the rod-like member 60 from becoming an obstacle when the main side frame 21 and the lower side frame 22 are fixed together by welding. Further, since the first extension portion 62 extends obliquely in a rearward and downward direction relative to the weld W4, the length of the main body portion 61 can be increased in the upper-lower direction, and according to this increased length, the size of the side portion constituent portion P31 arranged at the lower part of the main body portion 61 can be decreased, so that a repulsive force at the time of attachment of the skin member E and the like can be reduced.

Figure 7:
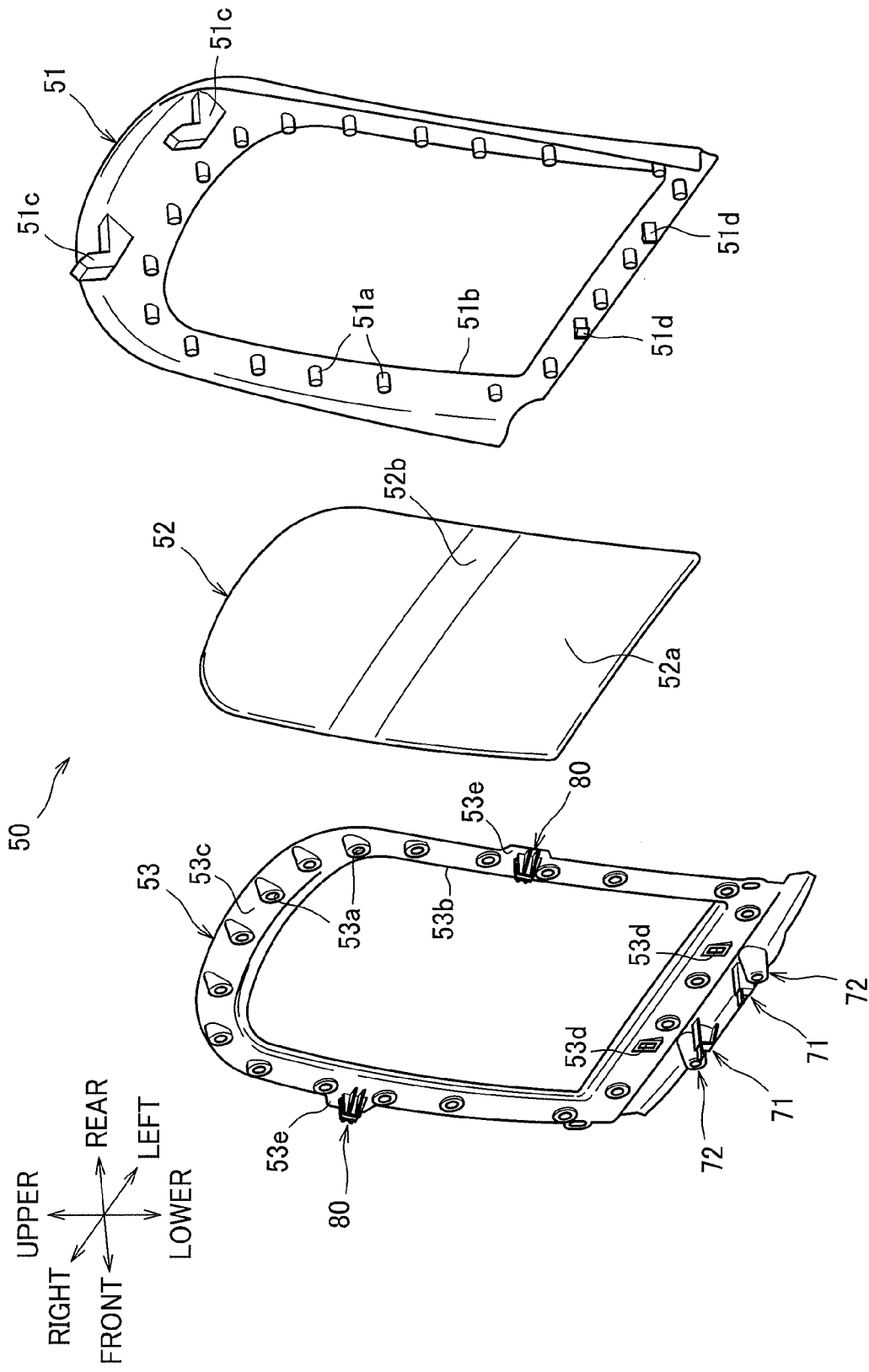
FIG. 7 is an exploded perspective view of a back board.

As seen in FIG. 7, the back board 50 includes an outer board 51 made of a plastic resin (as an example of a third member), a pocket member 52 made of a synthetic leather or fabric, and an inner board 53 made of a plastic resin (as an example of a first member).

The outer board 51 is shaped like a substantially rectangular frame, and includes an opening 51b and a plurality of welding bosses 51a provided at the front side of the outer board 51 to protrude frontward and surrounding the opening 51b. The welding bosses 51a are inserted into corresponding welding holes 53a provided in the inner board 53 while the pocket member 52 is sandwiched between the outer board 51 and the inner board 53, and then the welding bosses 51a are fused, so that the outer board 51 and the inner board 53 retains the pocket member 52 between them.

Provided at the front lower portion of the outer board 51 are a pair of right and left hook-shaped claw portions 51d which are spaced apart laterally and protrude frontward and then laterally inward in the right-left direction. The claw portions 51d are claws engageable with a pair of right and left engagement holes 53d formed in the lower portion of the inner board 53; by these claw portions 51d and the engagement holes 53d, the outer board 51 and the inner board 53 can be temporarily assembled together.

Provided at the front upper portion of the outer board 51 are a pair of right and left hook-shaped portions 51c which protrude frontward and then upward. The hook-shaped portions 51c are configured such that when the outer board 51 and the inner board 53 are welded together, they are located above the inner board 53; the hook-shaped portions 51c are engageable with the rigid wire 42 shown in FIG. 2 from the lower side thereof at the time of attachment of the back board 50 to the seat back frame F2.

Accordingly, the outer board 51 can be roughly positioned in the upper-lower direction and its upper portion can be prevented from falling backward.

The pocket member 52 comprises a plurality of layered skin members each made of a synthetic leather or fabric, so that a pocket portion 52a for storage of items can be formed; the inlet portion 52b of the pocket portion 52a includes a plate-like member provided between the layered skin members for the purpose of improving the usability of the pocket portion 52a. For this purpose, the inlet portion 52b forms a thickened portion that is the thickest portion of the pocket member 52.

The inner board 53 is shaped like a substantially rectangular frame, and the plurality of welding holes 53a corresponding to the plurality of welding bosses 51a of the outer board 51 are provided to surround an opening 53b. To be more specific, the plurality of welding holes 53a are arranged at positions along the outer peripheral edges of the frame-like main body portion 53c (inwardly of protruding tabs 53e to be described later).

Figure 8:
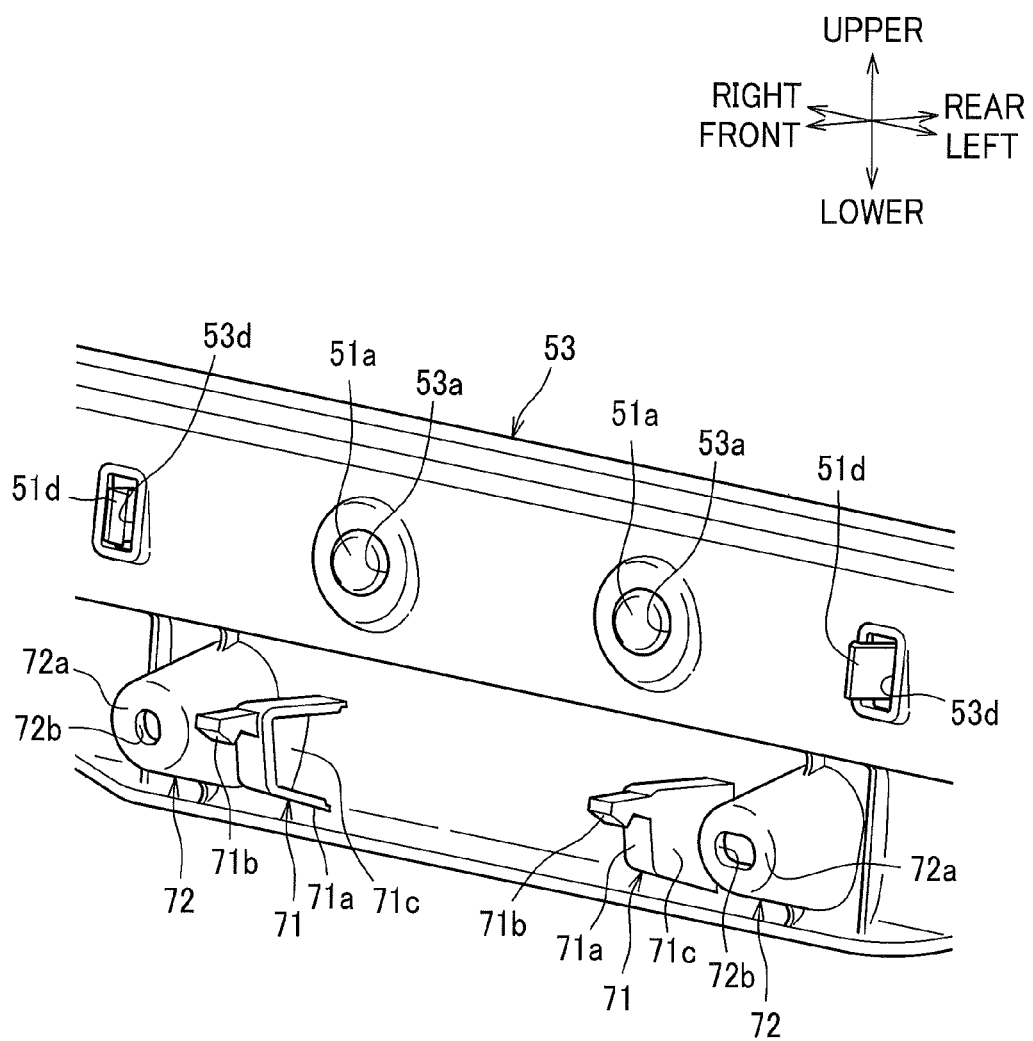
FIG. 8 is an enlarged perspective view showing a lower portion of an inner board.
Figure 9:
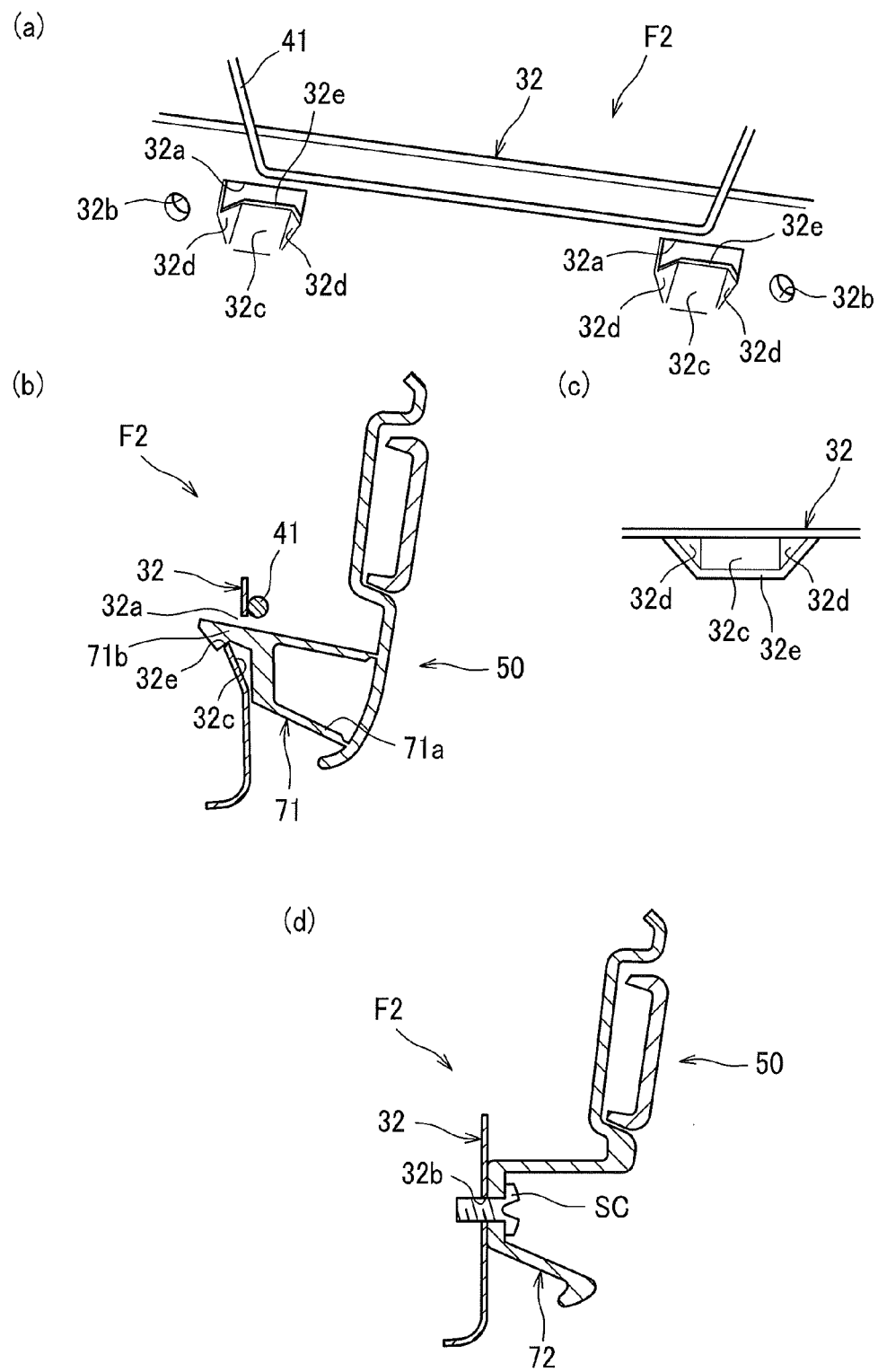
FIG. 9 includes an enlarged perspective view (a) of a structure around temporary joint holes for a connecting beam as viewed from the rear side, a sectional view (b) showing a state in which a temporary joint portion is engaged with a temporary joint hole, a top view (c) of the temporary joint hole as viewed from above, and a sectional view (d) showing a state in which a fixing portion is fixed to a fixing hole.

Provided at the lower portion of the inner board 53 are the pair of engagement holes 53d described above, and as seen in FIGS. 8 and 9, right and left temporary joint portions 71 and right and left fixing portions 72 are provided in pair at the lower side of the pair of engagement holes 53d; the temporary joint portions 71 are configured to be engageable with the connecting beam 32 of the seat back frame F2 so that they are retained by the connecting beam 32, and the fixing portions 72 are configured to be fixed to the connecting beam 32. The left temporary joint portion 71 is laterally adjacent to the left fixing portion 72, and the right temporary joint portion 71 is laterally adjacent to the right fixing portion 72.

As the temporary joint portions 71 and the fixing portions 72 are adjacent to each other as described above, they are less likely to be affected by the manufacturing error; therefore, even if fixing positions (fixing holes 32b to be described later) of the fixing portions 72 and the connecting beam 32 are misaligned due to the manufacturing error, the amount of misalignment is very small after the temporary joint portions 71 are engaged with the connecting beam 32 at predetermined engagement portions (i.e., temporary joint holes 32a to be described later). Accordingly, it is possible to ease the positioning work for positioning the fixing portions 72 to the fixing positions.

Further, since the temporary joint portions 71 and the fixing portions 72 are laterally adjacent to each other, the sizes of the back board 50 and the connecting beam 32 as assembled can be decreased in the upper-lower direction, for example, as compared to the configuration in which each of the temporary joint portions and each of the fixing portions are vertically adjacent to each other; this can result in miniaturization and weight reduction.

In terms of another aspect of the layout of the right and left temporary joint portions 71 and the fixing portions 72 as described above, one temporary joint portion 71 and one fixing portion 72 which are laterally adjacent to each other are provided in pair, and two pairs of these portions 71, 72 are laterally spaced apart from each other. In each of these pairs, the fixing portion 72 is located laterally outward of the adjacent temporary joint portion 71.

With this configuration, the distance between each of the right and left end portions of the back board 50 and the corresponding fixing portion 72 can be decreased, for example, as compared to the configuration in which the fixing portions are arranged laterally inward of the temporary joint portions; therefore, the moment applied to the fixing portion 72 when the right or the left end portion of the back board 50 fixed to the connecting beam 32 is tugged can be lessened, so that the attachment rigidity of the back board 50 to the connecting beam 32 can be enhanced.

More specifically, each temporary joint portion 71 includes a base portion 71a which protrudes frontward from the back board 50, and an engagement portion 71b which protrudes frontward from the base portion 71a and configured to be engageable with a corresponding temporary joint hole 32a of the connecting beam 32. The base portion 71a is shaped like a tube having a bottom, which opens laterally inward toward the opposite side that is away from the adjacent fixing portion 72.

Since the base portion 71a is shaped like a tube having a bottom (hollow shape), the weight of the back board 50 can be reduced, for example, as compared to the configuration in which the base portion is solid. Further, since the bottomed tubular-shaped base portion 71a opens toward the opposite direction away from the fixing portion 72, a wall 71c corresponding to the bottom of the bottomed tubular-shaped base portion 71a is adjacent to the fixing portion 72, so that the rigidity of the fixing portion 72 can be enhanced.

The engagement portion 71b is shaped like a hook which protrudes frontward and then downward, and the lateral width of the front end of the engagement portion 71b is smaller than the lateral width of the temporary joint hole 32a.

The fixing portion 72 protrudes frontward from the back board 50 and is shaped like a rearwardly opening tube having a bottom. The fixing portion 72 tapers toward the front, so that the rigidity of the fixing portion 72 per se can be enhanced.

Further, a through-hole 72b is formed in a wall 72a that is the bottom of the bottomed tubular fixing portion 72; the through-hole 72b is used for inserting a screw SC by which the fixing portion 72 is fixed to the connecting beam 32. The through-hole 72b formed in the right fixing portion 72 is formed as an oblong hole extending in the upper-lower direction, and the through-hole 72b formed in the left fixing portion 72 is formed as an oblong hole extending in the right-left direction. With this configuration, even if the back board 50 made of a plastic resin thermally expands in the upper-lower and right-left directions, the through-holes 72b can limit the influence of the thermal expansion.

As seen in FIG. 9(a), the connecting beam 32 includes a pair of right and left temporary joint holes 32a with which the distal ends of the engagement portions 71b of the pair of right and left temporary joint portions 71 are engageable, and a pair of right and left fixing holes 32b arranged laterally outward of the pair of right and left temporary joint holes 32a. Provided under each of the temporary joint holes 32a is a first slanted surface 32c for guiding the distal end of the engagement portion 71b of the temporary joint portion 71 toward the temporary joint hole 32a from lower side to upper side.

Accordingly, since the first slanted surface 32c can guide the distal end of the engagement portion 71b of the temporary joint portion 71 in the upper-lower direction toward the temporary joint hole 32a, it is possible to ease the attachment work of the back board 50.

Further, a pair of second slanted surfaces 32d are provided at right and left sides of the first slanted surface 32c; the second slanted surfaces 32d are configured to guide the distal end of the engagement portion 71b of the temporary joint portion 71 in a laterally inward direction. Accordingly, since the engagement portion 71b of the temporary joint portion 71 can be guided toward the first slanted surface 32c, it is possible to ease the attachment work of the back board.

The first slanted surface 32c and the second slanted surfaces 32d provided at both right and left sides of the first slanted surface 32c are integrally formed as a recess portion, and the distal end of the engagement portion 71b of the temporary joint portion 71 is engageable with the upper edge portion 32e of the recess portion, which forms the lower edge of the temporary joint hole 32a. Since the first slanted surface 32c and the second slanted surfaces 32d are integrally formed as a recess portion, the distal end of the engagement portion 71b of the temporary joint portion 71 engages with the upper edge portion 32e of the recess portion having enhanced rigidity due to the recessed shape, so that the temporary joint of the back board 50 can be excellently performed.

Further, as viewed from the rear side, the temporary joint holes 32a are provided at positions not overlapping (avoiding) the wires 41 for supporting the occupant. Therefore, when the distal ends of the engagement portions 71b of the temporary joint portions 71 are engaged with the temporary joint holes 32a, it is possible to prevent the distal ends of the engagement portions 71b from interfering with the wire 41.

Figure 10:
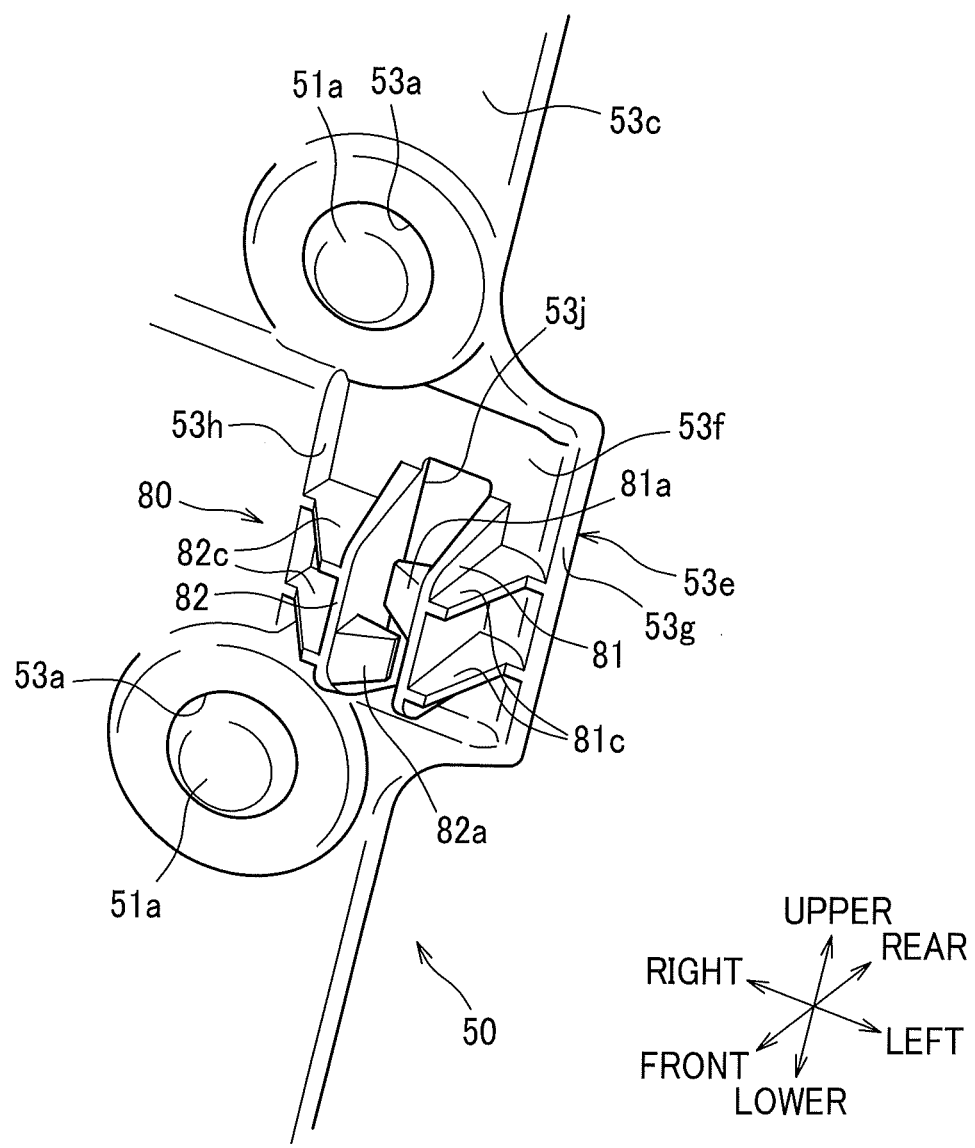
FIG. 10 is an enlarged perspective view showing a structure of a plate-like hook.
Figure 11:
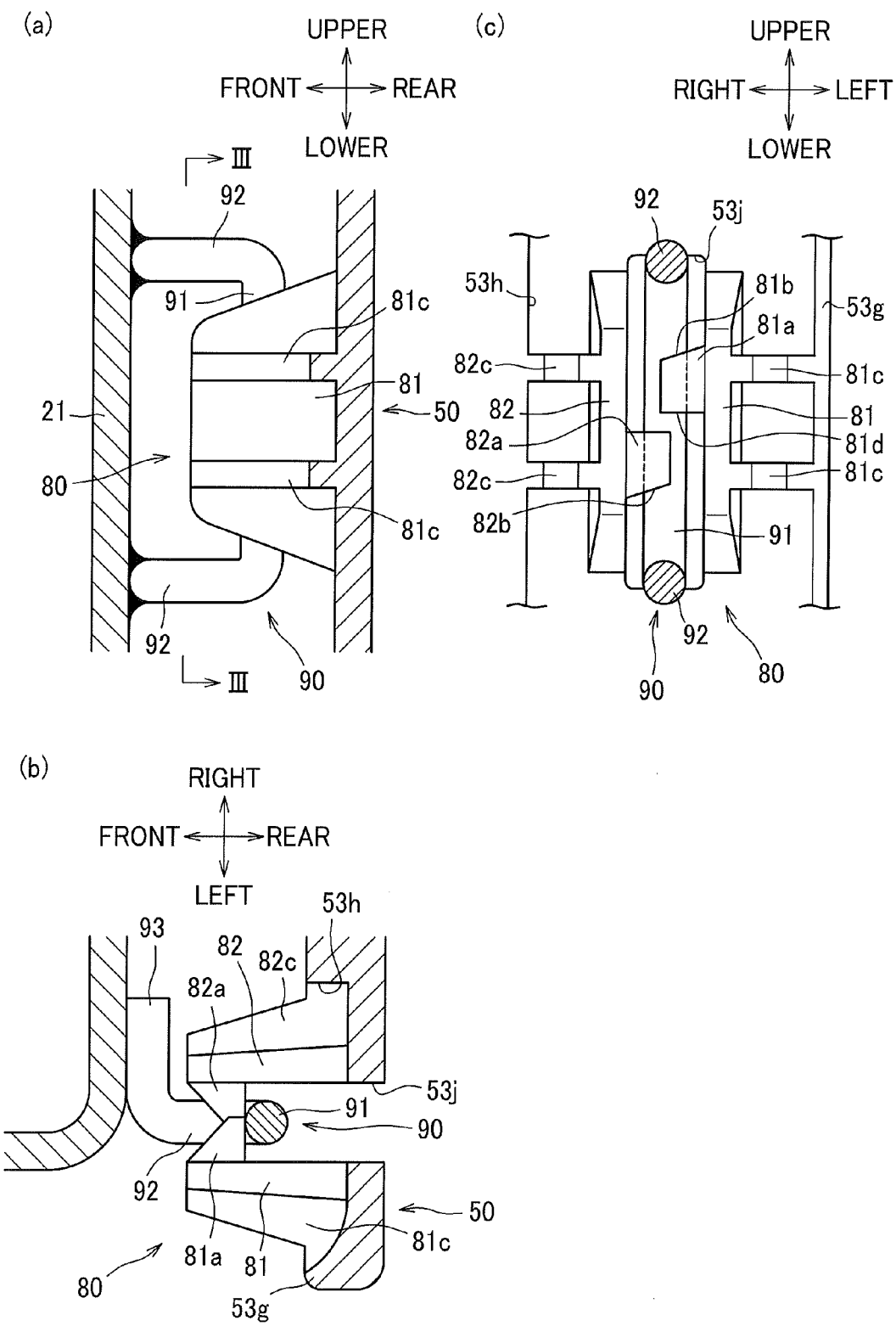
FIG. 11 includes (a) a side view, (b) a top view, and (c) a front view, showing a state in which the plate-like hook is engaged with an engagement metal part.

Returning to FIG. 7, protruding tabs 53e are provided substantially centrally at both right and left side portions of the main body portion 53c of the inner board 53 so as to protrude outward from the outer peripheral edges of the main body portion 53c. And as seen in FIGS. 10 and 11, a pair of plate-like hooks 80 are provided at positions adjacent to the right and left protruding tabs 53e; each of the plate-like hooks 80 is engageable with an engagement metal part 90 provided on the main side frame 21 (as an example of a second member) and having a U-shaped form as viewed from side (see FIG. 11(a)).

The engagement metal part 90 is made by bending both end portions of a rod-like member having a tubular section to provide a U-shaped profile as viewed from side and thereafter bending the end portions laterally inward. To be more specific, the engagement metal part 90 includes a first rod-like portion 91 extending in the upper-lower direction, second rod-like portions 92 extending frontward from upper and lower end portions of the first rod-like portion 91, and third rod-like portions 93 extending laterally inward from the second rod-like portions 92 (see FIG. 11(b)).

Each of the plate-like hooks 80 includes a first plate-like portion 81 protruding frontward from the back board 50, and a second plate-like portion 82 protruding frontward from the back board 50 and located laterally opposite the first plate-like portion 81. In this embodiment, the front-rear direction corresponds to a first direction, the right-left direction corresponds to a second direction, and the upper-lower direction corresponds to a third direction.

Provided at an upper portion of the front end portion of the inner surface (i.e., surface facing the second plate-like portion 82) of the first plate-like portion 81 is a first engagement portion 81a which protrudes from this upper portion toward the second plate-like portion 82. Similarly, provided at a lower portion of the front end portion of the inner surface (i.e., surface facing the first plate-like portion 81) of the second plate-like portion 82 is a second engagement portion 82a which protrudes from this lower portion toward the first plate-like portion 81.

In a state in which the plate-like hook 80 is engaged with the engagement metal part 90, the first rod-like portion 91 of the engagement metal part 90 is held between the first plate-like portion 81 and the second plate-like portion 82, and the first engagement portion 81a and the second engagement portion 82a are engaged with the first rod-like portion 91 from the front side. Since the widths of the plate-like portions 81, 82 are wider in the upper-lower direction than the widths of the corresponding engagement portions 81a, 82a, the rigidity of these plate-like portions 81, 82 can be enhanced, so that the engagement portions 81a, 82a and the first rod-like portion 91 can engage more tightly with each other.

The first plate-like portion 81 (i.e., part of the plate-like hook 80) is disposed on the protruding tab 53e which protrudes outward from the outer peripheral edge of the main body portion 53c of the inner board 53. Accordingly, the distance between each of the right and left end portions of the back board 50 and the plate-like hook 80 can be decreased, for example, as compared to the configuration in which the entire plate-like hook 80 is disposed on the main body portion 53c; therefore, the moment applied to the plate-like hook 80 when the right or the left end portion of the back board 50 is tugged can be lessened, so that the plate-like hook 80 is less likely to come off the engagement metal part 90.

The protruding tabs 53e are provided only where the plate-like hooks 80 are disposed, and the other outer peripheral edges (outer peripheral edges of the main body portion 53c) are located inward of the protruding tabs 53e; therefore, the weight of the inner board 53 can be reduced, for example, as compared to the configuration in which the outer peripheral edges of the main body portion 53c extend to the outer peripheral edges of the protruding tabs 53e.

Further, as seen in FIG. 11(c), outer surfaces 81b, 82b of the engagement portions 81a, 82a, which are located outward in the upper-lower direction, are each configured to slant so as to be positioned inward in the upper-lower direction as it goes inward in the right-left direction. Accordingly, when the plate-like hook 80 is caused to move in the upper-lower direction, the slanted surface 81b or 82b is brought into contact with the second rod-like portion 92 to thereby cause the plate-like portions 81, 82 to spread out; therefore, the engagement portions 81a, 82a can be configured to easily come off the second rod-like portions 92 in the upper-lower direction.

To be more specific, for example, when the plate-like hook 80 is moved downward, the slanted surface 82b of the second engagement portion 82a is brought into contact with the lower second rod-like portion 92, so that the second plate-like portion 82 spreads out to the right side. After that, the surface 81d orthogonal to the upper-lower direction of the first engagement portion 81a is brought into contact with the second rod-like portion 92 and the movement of the plate-like hook 80 is stopped; however, the second plate-like portion 82 can further spread out to the right side by changing the moving direction of the plate-like hook 80 to the diagonally downward-and-left direction, whereby the engagement portions 81a, 82a can be disengaged from the second rod-like portions 92.

As seen in FIG. 10, there are two ribs (as an example of ridge portions) 81c, 82c provided on each of laterally outer surfaces of the first plate-like portion 81 and the second plate-like portion 82. This can enhance the rigidity of each of the plate-like portions 81, 82.

Especially, in this embodiment, the first plate-like portion 81 and the second plate-like portion 82 are provided on the bottom surface of a recess portion 53f formed to extend over the main body portion 53c and each protruding tab 53e of the back board 50. Accordingly, a left wall 53g which protrudes frontward from the bottom surface of the recess portion 53f is formed at the left side (i.e., opposite side from the first plate-like portion 81) of the ribs 81c, and a right wall 53h which protrudes frontward from the bottom surface of the recess portion 53f is formed at the right side (i.e., opposite side from the second plate-like portion 82) of the ribs 82c.

The ribs 81c of the first plate-like portion 81 are configured to connect the laterally outer surface of the first plate-like portion 81, the bottom surface of the recess portion 53f, and the left wall 53g. Similarly, the ribs 82c of the second plate-like portion 82 are configured to connect the laterally outer plane of the second plate-like portion 82, the bottom surface of the recess portion 53f, and the right wall 53h.

With this configuration, the rigidity of each of the plate-like portions 81, 82 can be enhanced further, for example, as compared to the configuration in which the ribs are not connected to the bottom surface of the recess portion or to the right and left walls.

Further, a substantially rectangular hole 53j elongated in the upper-lower direction is formed in the back board 50 between the plate-like portions 81, 82. The hole 53j is formed such that the lateral width thereof is substantially the same as the distance between the plate-like portions 81, 82, and that the length thereof in the upper-lower direction is slightly greater than the length of the plate-like portions 81, 82 in the upper-lower direction. With this configuration, the weight of the back board 50 can be reduced.

Further, the plate-like portions 81, 82 are provided between two adjacent fixing points (welding bosses 51a and welding holes 53a). Since the plate-like portions 81, 82 are provided at a higher-rigidity area between the two adjacent fixing points, the rigidity of the plate-like portions 81, 82 can be further enhanced.

Further, at least one of the two adjacent fixing points located to sandwich the above-described plate-like portions 81, 82 is arranged in the proximity of the thickened pocket portion 52a of the pocket member 52 as shown in FIG. 7. Since the thickened pocket portion 52a of the pocket member 52 can be firmly retained by the fixing points by the aforementioned configuration in which at least one of the two adjacent fixing points located to sandwich the plate-like portions 81, 82 is arranged in the proximity of the pocket portion 52a of the pocket member 52, it is possible to render the pocket member 52 and the outer board 51 substantially flush with each other.

Although one embodiment of the present invention has been described above, the present invention can be practiced, as shown in the following embodiments, with various modifications and changes.

In the above embodiment, each of the engagement portions 81a, 82a has the slanted surface 81b, 82b. However, the present invention is not limited to this configuration. For example, if the second rod-like portion is provided only at one end portion of the first rod-like portion and the other end portion of the first rod-like portion is fixed to a wall or the like (i.e., the engagement hook can be disengaged only from the second rod-like portion side provided at one end portion), only the outer surface of one of the first engagement portion and the second engagement portion closer to the second rod-like portion may be configured to slant so as to be positioned inward in the third direction as it goes inward in the second direction.

In the above embodiment, the ribs 81c, 82c have been taken as an example of ridge portions. However, the present invention is not limited to this configuration; for example, the ridge portion may be a bead formed as an outwardly recessed portion of the plate-like portion.

In the above embodiment, the temporary joint portion 71 and the fixing portion 72 are laterally adjacent to each other. However, the present invention is not limited to this configuration, and the temporary joint portion and the fixing portion can be located adjacently in any directions.

In the above embodiment, the fixing portions 72 are arranged laterally outward of the temporary joint portions 71. However, the present invention is not limited to this configuration. In contrast to this configuration, the fixing portions may be arranged laterally inward of the temporary joint portions. Further, the shapes and the geometry of the fixing portions and the temporary joint portions are not limited to the above embodiment, and may be changed or modified where appropriate.

In the above embodiment, the car seat S used in a car has been taken as an example of a vehicle seat. However, the present invention is not limited to the car seat and applicable to other vehicle seat, such as a seat for a marine vessel and a seat for an aircraft.

The invention claimed is:

1. An attachment structure for members, by which a first member and a second member are attached to each other, wherein the first member is provided with:
a first plate-like portion protruding in a first direction from the first member;
a second plate-like portion protruding in the first direction from the first member and located opposite the first plate-like portion in a second direction that is orthogonal to the first direction;
a first engagement portion protruding from a distal end portion of the first plate-like portion toward the second plate-like portion at a position shifted to a first side in a third direction that is orthogonal to the first direction and the second direction; and
a second engagement portion protruding from a distal end portion of the second plate-like portion toward the first plate-like portion at a position shifted to a second side that is opposite to the first side in the third direction, and
wherein the second member is provided with a first rod-like portion configured to be disposed between the first plate-like portion and the second plate-like portion and to be engaged with the first engagement portion and the second engagement portion,
the second member is provided with a second rod-like portion extending in the first direction from the first rod-like portion, and
the first engagement portion has an outer surface located at an outer side in the third direction and the second engagement portion has an outer surface located at an outer side in the third direction, and the outer surface of one of the first and second engagement portions closer to the second rod-like portion is configured to slant so as to be positioned inward in the third direction as it goes inward in the second direction.

2. The attachment structure for members according to claim 1, wherein each of the first plate-like portion and the second plate-like portion is provided with a ridge portion.

3. The attachment structure for members according to claim 2, wherein the ridge portion of each of the first plate-like portion and the second plate-like portion is a rib, and
wherein each of the first plate-like portion and the second plate-like portion has an outer surface that is located at an outer side in the second direction and connected to the first member by the rib.

4. The attachment structure for members according to claim 3, wherein a wall protruding in the first direction from the first member is provided at one side of the rib opposite the first plate-like portion, and
wherein the rib and the wall are connected together.

5. The attachment structure for members according to claim 1, wherein the first member has a hole formed between the first plate-like portion and the second plate-like portion.

6. The attachment structure for members according to claim 1, further comprising a third member to which the first member is fixed at a plurality of fixing points, and wherein the first and second plate-like members are provided between two adjacent fixing points.

7. An attachment structure for members, by which a first member and a second member are attached to each other, and a third member to which the first member is fixed at a plurality of fixing points,
wherein the first member is provided with:
a first plate-like portion protruding in a first direction from the first member;
a second plate-like portion protruding in the first direction from the first member and located opposite the first plate-like portion in a second direction that is orthogonal to the first direction;
a first engagement portion protruding from a distal end portion of the first plate-like portion toward the second plate-like portion at a position shifted to a first side in a third direction that is orthogonal to the first direction and the second direction; and
a second engagement portion protruding from a distal end portion of the second plate-like portion toward the first plate-like portion at a position shifted to a second side that is opposite to the first side in the third direction,
wherein the second member is provided with a first rod-like portion configured to be disposed between the first plate-like portion and the second plate-like portion and to be engaged with the first engagement portion and the second engagement portion,
the first and second plate-like members are provided between two adjacent fixing points,
the second member is a seat back frame for a vehicle seat, and the first member and the third member are members that constitute a back board provided at a rear side of the seat back frame, the first member and the third member having frame shapes and configured to sandwich a pocket member between them, and
at least one of the two fixing points is located in proximity to a thickened portion of the pocket member.

8. The attachment structure for members according to claim 7, wherein at least a part of the first and second plate-like portions is located on a protruding tab configured to protrude outward from an outer peripheral edge of the first member, and
wherein the plurality of fixing points are arranged at positions inward of the protruding tab.

9. A vehicle seat comprising:
a seat back frame; and
a back board provided at a rear side of the seat back frame,
wherein the back board includes at least one fixing portion fixed to the seat back frame, and at least one temporary joint portion engageable with the seat back frame so as to be retained by the seat back frame,
the at least one fixing portion and the at least one temporary joint portion are adjacent to each other, and
the seat back frame includes:
at least one hole with which a distal end of the at least one temporary joint portion is engageable, and
a first slanted surface provided under the at least one hole, the first slanted surface configured to guide the distal end of the at least one temporary joint portion toward the at least one hole from a lower side to an upper side.

10. The vehicle seat according to claim 9, wherein the at least one fixing portion and the at least one temporary joint portion are provided at a lower portion of the back board such that they are laterally adjacent to each other.

11. The vehicle seat according to claim 9, wherein the at least one fixing portion and the at least one temporary joint portion are provided in pair at right and left sides of a lower portion of the back board, and wherein the at least one fixing portion is arranged laterally outwards of the at least one temporary joint portion.

12. The vehicle seat according to claim 9, wherein a pair of second slanted surfaces configured to guide the distal end of the at least one temporary joint portion in a laterally inward direction are provided at right and left sides of the first slanted surface.

13. The vehicle seat according to claim 12, wherein the first slanted surface and the second slanted surface are integrally formed as a recess portion, and wherein the distal end of the at least one temporary joint portion is engageable with an upper edge portion of the recess portion, which forms a lower edge of the hole.

14. The vehicle seat according to claim 13, wherein the distal end of the at least one temporary joint portion has a lateral width smaller than that of the hole.

15. The vehicle seat according to claim 9, wherein the seat back frame includes a wire for supporting an occupant, and wherein as viewed from a rear side, the hole is formed in a position not overlapping the wire.

16. The vehicle seat according to claim 9, wherein the at least one temporary joint portion includes a base portion protruding frontward from the back board, and an engagement portion protruding frontward from the base portion and configured to be engageable with the seat back frame, and wherein the base portion is shaped like a bottomed tube which opens in a direction away from the at least one fixing portion.

17. The vehicle seat according to claim 9, wherein the seat back frame comprises right and left side frames, an upper frame configured to connect upper portions of the right and left side frames, and a lower frame configured to connect lower portions of the right and left side frames, wherein the at least one hole is formed in the lower frame, wherein the at least one temporary joint portion is configured to protrude frontward from the back board and to be inserted into the at least one hole to engage therewith, and wherein the back board further comprises second temporary joint portions disposed above the at least one temporary joint portion and configured to be attached temporarily to the right and left side frames, respectively.

18. The vehicle seat according to claim 17, wherein the at least one temporary joint portion is shaped as a hook whose end protrudes downward.

19. The vehicle seat according to claim 17, wherein the at least one fixing portion and the at least one temporary joint portion are provided in pair at right and left sides of a lower portion of the back board, and wherein the fixing portions are arranged laterally outwards of the temporary joint portions.

* * * * *